United States Patent Office 3,182,047
Patented May 4, 1965

3,182,047
AMINO ALCOHOL MODIFIED POLYACRYLATES
Herbert L. Wehrmeister and Harold I. Yalowitz, Terre Haute, Ind., assignors to Commercial Solvents Corporation, New York, N.Y., a corporation of Maryland
No Drawing. Filed June 2, 1961, Ser. No. 114,316
19 Claims. (Cl. 260—89.5)

Our invention relates to new and useful polymeric compositions and a process for preparing same, and more particularly our invention relates to new and useful polymers which are the reaction products of polyacrylates having the following general formula:

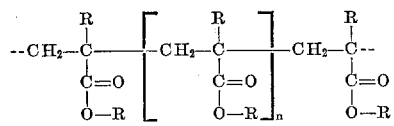

where R is a lower alkyl radical and $n$ is an integer ranging from 10 to 1,000 and amino alcohols having the following general formula:

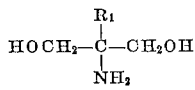

where $R_1$ is either hydroxyalkyl, alkyl, or hydrogen.

Polyacrylate polymers have found use as protective coatings, adhesives, impregnating agents for textiles, and finishes for leather. Also, like many other plastics they are suitable for compression and injection molding. Sheets of one of the more common polyacrylates, methyl methacrylate, is further distinguished in that it represents by its colorless transparency the nearest approach at the present time to an organic glass. Polyacrylates as a class are stable to light but are only moderately stable to heat thus restricting their uses in situations in which higher temperatures are involved.

We have now discovered new modified polyacrylate polymers which not only possess many of the desirable properties of unmodified polyacrylates but which have increased heat stability. Thus, our new modified polyacrylates can be utilized, because of their increased resistance to heat, under temperature conditions in which the unmodified material would be found useless.

The new compositions of our invention can be prepared by interacting polyacrylates having the following general formula:

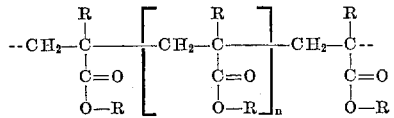

where R is lower alkyl and $n$ is an integer between 10 and 1,000 with an amino alcohol having the following general formula:

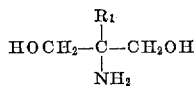

wherein $R_1$ is either hydroxyalkyl, alkyl, or hydrogen. We prefer, in preparing the compositions of our invention, to first thoroughly mix the polyacrylate and the amino alcohol in molar ratios of from about 500 to 10 of the polyacrylate to 1 of the amino alcohol. We then heat the mixture at temperatures above 150° C. but below the temperature at which substantial decomposition of the reaction products and the reactants take place. After the reaction is completed we allow the reaction product to cool and, upon cooling, remove it from the reaction vessel.

Ordinarily at temperatures below 160° C. the reaction proceeds rather slowly while temperatures in excess of 300° C. give some decomposition of reactants. Generally temperatures ranging from about 160 to about 220° C. are preferred. Our new compounds can be prepared at atmospheric pressure; however, reduced pressures such as about 200 mm. can also be utilized.

Included among the polyacrylates which are operative in our invention are methyl methacrylate, ethyl methacrylate, methyl ethacrylate, and butyl methacrylate resins. Included among the amino alcohols which are operative in our invention are tris(hydroxymethyl)aminomethane, 2 - amino - 2 - methyl - 1,3 - propanediol, 2 - amino - 2-ethyl-1,3-propanediol, 2-amino-1,3-propanediol, etc., and the like.

The molar ratios of the reactants are critical in producing a product which is stable when subjected to heat. Thermal stability is observed when molar ratios as high as 500 of polyacrylate to 1 of amino alcohol are employed. Thermal stability is also observed when molar ratios as low as 10 of polyacrylate to 1 of amino alcohol are employed. Products having maximum thermal stability, however, are prepared using molar ratios of polyacrylate to amino alcohol of from about 100 to 1 to about 20 to 1 respectively.

The improved thermal stability of our new compositions is readily demonstrated by comparing the deformation of the modified material when subjected to a given pressure under an arbitrary set of temperature conditions with the deformation of unmodified material subjected to the same given pressure under the same conditions. This comparison can be made using the standard method of test for deflection temperature of plastics under load described in American Society for Testing Materials, Part IX, 1958, pages 376–379 (ASTM Designation D648–56). This test consists essentially of applying a given pressure to a specimen immersed in a suitable liquid heat transfer medium and supported on each end by vertical supports the pressure being applied midway between the points of vertical support and continually raising the temperature of the liquid heat transfer medium until deflection of the specimen is detected. The temperature at which the specimen is deflected is then designated as the deflection temperature.

The following specific examples are offered to illustrate our invention and it is not intended that our invention be limited to the specific amounts, proportions, and procedures set forth therein.

*Example 1*

200 grams of polymethyl methacrylate and 0.25 gram of tris(hydroxymethyl)aminomethane were thoroughly mixed in a ball mill for a period of eight hours. A 50-gram portion of the mixed material was then placed in a 100 cc. Carius tube, flushed with nitrogen, evacuated, and sealed. The sealed tube was then heated for a period of eight hours at a temperature of between 190 and 200° C. At the end of the eight-hour period the product was removed from the furnace and allowed to cool to room temperature. Upon cooling to approximately room temperature the material was removed from the tube.

A portion of the thus produced polyacrylate, four inches in length and one-fourth inch in thickness was subjected to the previously described test for deflection temperature of plastics and was found to have a deflection temperature of 83° C. A portion of unmodified polymethylmethacrylate four inches in length and one-fourth inch in thickness was also subjected to the same test and was found to have a a deflection temperature of 62° C. thus demonstrating the improved thermal stability of our amino alcohol modified polyacrylates.

Example II

Essentially the same procedure was followed as described under Example I with the exception that 200 grams of polybutyl methacrylate and 0.30 gram of tris-(hydroxymethyl)aminomethane were used. Upon cooling to approximately room temperature the material was removed from the tube.

The heat deflection temperature of the amino alcohol modified polybutyl methacrylate was compared with unmodified polybutyl methacrylate and results similar to those shown in Example I were obtained.

Example III

Essentially the same procedure was followed as described under Example I with the exception that 0.25 gram of 2-amino-2-methyl-1,3-propanediol was used. Upon cooling to approximately room temperature the material was removed from the tube.

The heat deflection temperature of the amino alcohol modified material was compared with the heat deflection temperature of unmodified polymethyl methacrylate and results similar to those of Example I were obtained.

Example IV

Essentially the same procedure was followed as described under Example I with the exception that 200 grams of polymethyl ethacrylate and 0.25 gram of 2-amino-2-ethyl-1,3-propanediol were used. Upon cooling to approximately room temperature the material was removed from the tube.

The heat deflection temperature of the amino alcohol modified polymethyl ethacrylate was compared with unmodified polymethyl ethacrylate and results similar to those shown in Example I were obtained.

Now having described our invention, what we claim is:

1. A process for the preparation of modified polyacrylates which comprises interacting a polyacrylate selected from the group consisting of polyacrylates having the following general formula:

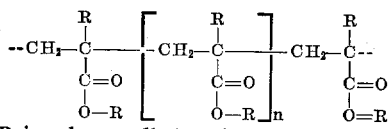

wherein R is a lower alkyl radical and $n$ is an integer of from 10 to 1,000 with an amino alcohol having the following general formula:

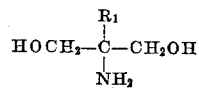

wherein $R_1$ is a member selected from the group consisting of hydroxyalkyl, alkyl, and hydrogen in molar ratios of the polyacrylate to the amino alcohol of from about 500 to 1 to about 10 to 1 and at a temperature above 150° C. but below temperatures causing any substantial decomposition of the reaction product and the reactants.

2. The process of claim 1 wherein the temperature ranges from about 160 to about 220° C. and the molar ratios of polyacrylate to amino alcohol are from about 100 to 1 to about 20 to 1.

3. The process of claim 1 wherein the amino alcohol is tris(hydroxymethyl)aminomethane.

4. The process of claim 1 wherein the amino alcohol is 2-amino-2-methyl-1,3-propanediol.

5. The process of claim 1 wherein the amino alcohol is 2-amino-2-ethyl-1,3-propanediol.

6. The process of claim 1 wherein the polyacrylate is polymethyl methacrylate.

7. The process of claim 1 wherein the polyacrylate is polybutyl methacrylate.

8. The process of claim 1 wherein the polyacrylate is polymethyl ethacrylate.

9. The process of claim 1 wherein the polyacrylate is polyethyl methacrylate.

10. As new compositions of matter, modified polyacrylates obtained by a process which comprises interacting a polyacrylate selected from the group consisting of polyacrylates having the following general formula:

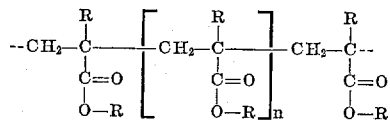

wherein R is lower alkyl radical and $n$ is an integer of from 10 to 1,000 with an amino alcohol having the following general formula:

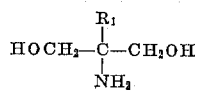

wherein $R_1$ is a member selected from the group consisting of hydroxyalkyl, alkyl, and hydrogen in molar ratios of the polyacrylate to the amino alcohol of from about 500 to 1 to about 10 to 1 at temperatures above 150° C. but below temperatures causing any substantial decomposition of the polymeric product and the reactants.

11. As new compositions of matter, modified polyacrylates obtained by a process which comprises interacting polymethyl methacrylate with an amino alcohol having the following general formula:

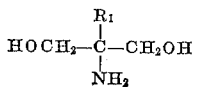

wherein $R_1$ is a member selected from the group consisting of hydroxyalkyl, alkyl, and hydrogen in molar ratios of the polyacrylate to the amino alcohol of from about 500 to 1 to about 10 to 1 and at temperatures above 150° C. but below temperatures causing any substantial decomposition of the polymeric product and the reactants.

12. As new compositions of matter, modified polyacrylates obtained by a process which comprises interacting polybutyl methacrylate with an amino alcohol having the following general formula:

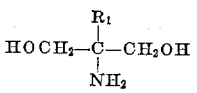

wherein $R_1$ is a member selected from the group consisting of hydroxyalkyl, alkyl, and hydrogen in molar ratios of the polyacrylate to the amino alcohol of from about 500 to 1 to about 10 to 1 and at temperatures above 150° C. but below temperatures causing any substantial decomposition of the polymeric product and the reactants.

13. As new compositions of matter, modified polyacrylates obtained by a process which comprises interacting polyethyl methacrylate with an amino alcohol having the following general formula:

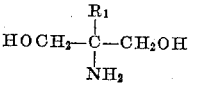

wherein $R_1$ is a member selected from the group consisting of hydroxyalkyl, alkyl, and hydrogen in molar ratios of the polyacrylate to the amino alcohol of from about 500 to 1 to about 10 to 1 and at temperatures above 150° C. but below temperatures causing any substantial decomposition of the polymeric product and the reactants.

14. As new compositions of matter, modified polyacrylates obtained by a process which comprises interacting polymethyl ethacrylate with an amino alcohol having the following general formula:

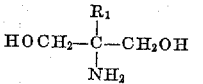

wherein $R_1$ is a member selected from the group consisting of hydroxyalkyl, alkyl, and hydrogen in molar ratios of the polyacrylate to the amino alcohol of from about 500 to 1 to about 10 to 1 and at temperatures above 150° C. but below temperatures causing any substantial decomposition of the polymeric product and the reactants.

15. As new compositions of matter, modified polyacrylates obtained by a process which comprises interacting a polyacrylate selected from the group consisting of polyacrylates having the following general formula:

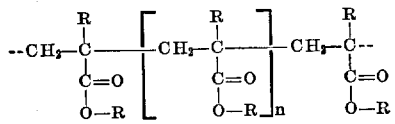

wherein R is a lower alkyl radical and $n$ is an integer of from 10 to 1,000 with tris(hydroxymethyl)aminomethane in molar ratios of the polyacrylate to the tris(hydroxymethyl)aminomethane of from about 500 to 1 to about 10 to 1 at temperatures above 150° C. but below temperatures causing any substantial decomposition of the polymeric product and the reactants.

16. As new compositions of matter, modified polyacrylates obtained by a process which comprises interacting a polyacrylate selected from the group consisting of polyacrylates having the following general formula:

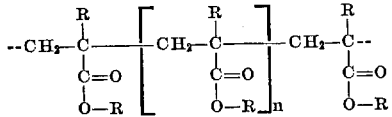

wherein R is a lower alkyl radical and $n$ is an integer of from 10 to 1,000 with 2-amino-2-methyl-1,3-propanediol in molar ratios of the polyacrylate to the 2-amino-2-methyl-1,3-propanediol of from about 500 to 1 to about 10 to 1 at temperatures above 150° C. but below temperatures causing any substantial decomposition of the polymeric product and the reactants.

17. As new compositions of matter, modified polyacrylates obtained by a process which comprises interacting a polyacrylate selected from the group consisting of polyacrylates having the following general formula:

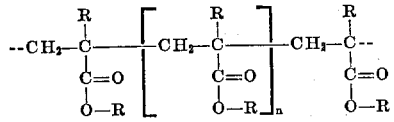

wherein R is a lower alkyl radical and $n$ is an integer of from 10 to 1,000 with 2-amino-2-ethyl-1,3-propanediol in molar ratios of the polyacrylate to the 2-amino-2-ethyl-1,3-propanediol of from about 500 to 1 to about 10 to 1 at temperatures above 150° C. but below temperatures causing any substantial decomposition of the polymeric product and the reactants.

18. A method for improving the heat stability of a polyacrylate of the general formula

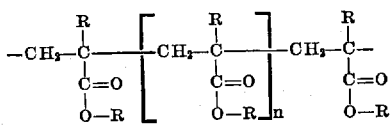

where R is a lower alkyl radical and $n$ is an integer ranging from 10 to 1000, which comprises interacting the polyacrylate with an amino alcohol having the general formula:

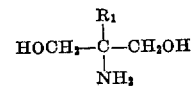

where $R_1$ is a member selected from the group consisting of hydroxyalkyl, alkyl and hydrogen in molar ratios of polyacrylate to amino alcohol of from about 500 to 1 to about 10 to 1 at a temperature above 150° C. but below a temperature of about 300° C.

19. The method of claim 18 wherein said amino alcohol is selected from the group consisting of tris(hydroxymethyl)aminomethane, 2-amino-2-methyl-1,3-propanediol, 2-amino-2-ethyl-1,3-propanediol and 2-amino-1,3-propanediol.

References Cited by the Examiner

UNITED STATES PATENTS 2,146,209  2/39  Graves _____ 260—72

FOREIGN PATENTS 642,414  9/50  Great Britain.
856,403  12/60  Great Britain.

JOSEPH L. SCHOFER, *Primary Examiner.*

P. E. MANGAN, DONALD E. CZAJA, *Examiners.*